United States Patent [19]

Monbaliu et al.

[11] 3,846,444

[45] Nov. 5, 1974

[54] METHOD FOR THE PREPARATION OF 3-ACYLAMINO-2-PYRAZOLIN-5-ONES

[75] Inventors: Marcel Jacob Monbaliu, Mortsel; Raphael Karel Van Poucke, Berchem, both of Belgium

[73] Assignee: Gevaert-Agfa, N.V., Mortsel, Belgium

[22] Filed: June 19, 1969

[21] Appl. No.: 834,858

[30] Foreign Application Priority Data
July 18, 1968   Great Britain .................... 34342/68

[52] U.S. Cl. ............................................ 260/310 A
[51] Int. Cl. ............................................ C07d 49/14
[58] Field of Search ................................ 260/310 A

[56] References Cited
UNITED STATES PATENTS
3,325,482   6/1967   Monbaliu et al. ................ 260/239.7
3,443,954   5/1969   Menzel et al. ........................ 96/100

FOREIGN PATENTS OR APPLICATIONS
1,007,847   10/1965   Great Britain ..................... 260/310

*Primary Examiner*—G. Thomas Todd
*Attorney, Agent, or Firm*—A. W. Breiner

[57]   ABSTRACT

A process for the preparation of 3-acylamino-2-pyrazolin-5-one comprising the reaction of a 3-amino-2-pyrazolin-5-one with an acid chloride or anhydride in the presence of a heterocyclic nitrogen-containing basic condensing agent and a Friedel Crafts metal halide is described. Improved yields and simplicity of separation are realized.

7 Claims, No Drawings

METHOD FOR THE PREPARATION OF 3-ACYLAMINO-2-PYRAZOLIN-5-ONES

The present invention relates to an improved process for the preparation of 3-acylamino-2-pyrazolin-5-ones, more particularly 3-carboxylic acid acylamino-and 3-sulphonic acid acylamino-2-pyrazolin-5-ones.

The preparation of 3-acylamino-2-pyrazolin-5-ones and their use as magenta-forming colour couplers in silver halide photography are known, e.g., from the U.S. Pat. No. 2,369,489.

As is described in the literature the 3-acylamino-2-pyrazolin-5-one compounds are generally prepared by condensation of 3-amino-2-pyrazolin-5-ones with acid chlorides in the presence of a basic condensing agent. It is known that such a condensation reaction often proceeds with side-reactions. In the presence of basic condensing agents acylation may take place not only on the 3-amino group but also, and in addition thereto, on the hydroxyl group of the enolized 2-pyrazolin-5-one compound since, as described by R. H. Wiley, P. Wiley in "Pyrazolones, Pyrazolidones and Derivatives," John Wiley and Sons, 1964, p. 131–138, the said hydroxy group is a potential reaction center for acid chloride compounds. This agrees with the experiences of A. Weissberger, et al, described in J. Am. Chem. Soc. 66, 1854 (1944) for reactions of 3-amino-2-pyrazolin-5-ones with carboxylic acid chlorides and of N. Kunimine described in J. Soc. Sci. Phot. Japan 17, (1955) 121–129 (C.A. 50 (1956) 15297) for reactions of 3-amino-2-pyrazolin-5-ones with sulphonic acid chlorides. According to W. Schindler, Z. Chem. 5, 382–3 (1965) it is also possible that in reactions with sulphonic acid chlorides disulfonylation takes place at the 3-amino group itself to form a 3-N,N-disulphonylamino-substituent.

The disadvantages of these diacylations are:

1. the need of an excess (generally 2 moles) of acid chloride for 1 mole of 3-amino-2-pyrazolin-5-one, and 2. an additional reaction step, viz. the alkaline or acid hydrolysis of the reaction product formed in order to obtain the desired 3-acylamino-2-pyrazolin-5-one compound.

In U.K. Pat. No. 1,007,847 an improved method for the preparation of 3-carboxylic acid acylamino-2-pyrazolin-5-ones is described according to which a carboxylic acid chloride or anhydride is allowed to react with a 3-amino-2-pyrazolin-5-one in the presence of a Friedel-Crafts metal halide as catalyst and an anhydrous inert solvent, the use of which is coupled with the use of Friedel-Crafts catalysts. By the application of the method described in the said U.K. Patent no O-acylation occurs so that the acid chloride can be used in an equimolecular amount with respect to the 3-amino-2-pyrazolin-5-one and that the reaction step for hydrolizing the 5-acyloxy group is no longer necessary.

Although it would be expected that the said method could also be successfully applied for the condensation reaction of the 3-amino-2-pyrazolin-5-one compounds with sulphochlorides instead of carboxylic acid chlorides because it is obvious to think that in analogous circumstances the sulphochlorides will have the same behaviour regarding the 3-amino-2-pyrazolin-5-ones as the corresponding carboxylic acid chlorides, it was found that said method failed to give successful results in the preparation of 3-sulphonamido-2-pyrazolin-5-one compounds. Indeed, besides low yields very unpure products were formed consisting of mixtures of monoand diacylated compounds and even unreacted 3-amino-2-pyrazolin-5-ones.

It has now been found that 3-sulphonamido-2-pyrazolin-5-one compounds can be successfully prepared by carrying out the condensation reaction of 3-amino-2-pyrazolin-5-ones with sulphonic acid chlorides in the presence of a Friedel Crafts metal halide, more particularly an aluminium halide such as aluminium chloride as well as a basic heterocyclic nitrogen-containing condensing agent such as pyridine and derivatives thereof, e.g., lutidine, picoline, etc.

It was further found that this new method is also very suitable for the preparation of 3-carboxylic acid acylamino-2-pyrazolin-5-ones; for this purpose the 3-amino-2-pyrazolin-5-ones are allowed to react with carboxylic acid chlorides or anhydrides in the presence of a said Friedel Crafts metal halide and a said basic heterocyclic nitrogen-containing condensing agent.

Thus, in accordance with the present invention an improved method is provided for the preparation of 3-acylamino-2-pyrazolin-5-ones which include 3-carboxylic acid acylamino-2-pyrazolin-5-ones as well as 3-sulphonic acid acylamino-2-pyrazolin-5-ones.

In the method of the present invention, aliphatic or alicyclic, aromatic, and heterocyclic carboxylic acid chlorides or anhydrides and sulphonic acid chlorides can be used which may either be substituted or not.

Because of their use as magenta-forming colour couplers in silver halide colour photography it is self-explanatory that the method of the invention is very important for the synthesis of 3-acylamino-2-pyrazolin-5-ones with particular substituents.

It is rather surprising to find that although in the process of the present invention a Friedel Crafts metal halide is used there can be dispensed with the inert-solvent, the use of which is coupled with the use of Friedel Crafts metal halides, and that a basic nitrogen-containing heterocyclic condensing agent can be used instead, whereby it is possible to prepare 3-sulphonamido-2-pyrazolin-5-ones with high yields of pure products without it being necessary to use an excess of sulphonic acid chloride relative to the 3-amino-2-pyrazolin-5-one and to hydrolyze the 5-acyloxy group since no diacylation occurs. Thus, according to the method of the invention the advantages offered by the method according to the U.K. Pat. No. 1,007,847 for the preparation of 3-carboxylic acid acylamino-2-pyrazolin-5-ones have been extended to the preparation of 3-sulphonamido-2-pyrazolin-5-ones which means that the amount of sulpho chloride can also be limited to an equimolecular amount with respect to the 3-amino-2-pyrazolin-5-one and that the reaction time can be considerably shortened since the 3-sulphonamido-2-pyrazolin-5-one compounds are prepared in one single reaction step because there can be dispensed with the alkaline or acid hydrolysis.

Moreover, since there can be dispensed with the use of the organic inert solvent, difficulties encountered when having to separate the 3-acylamino-2-pyrazolin-5-one formed from the organic reaction medium are avoided. According to the method of the invention, it suffices to precipitate the 3-acylamino-2-pyrazolin-5-one by simply pouring the reaction mixture into aqueous or alcoholic hydrochloric acid, the pyridine hydrochloride then formed remaining dissolved in the medium. In the method of U.K. Pat. No. 1,007,847 where an inert solvent is used, removal of the water-insoluble organic layer is not so easy to effect.

In accordance with the method of the present invention 3-acylamino-2-pyrazolin-5-ones are prepared in a high yield and with a high degree of purity. On the average, yields varying from 60 to 80 % are obtained.

The reaction conditions of the condensation reactions are determined by the nature of the heterocyclic nitrogen-containing basic condensing agent, the nature and the amount of Friedel Crafts metal halide used as well as by the reaction temperature.

In the preparation of 3-sulphonic acid acylamino-2-pyrazolin-5-ones the Friedel Crafts metal halide is generally used in approximately equimolecular amounts relative to the 3-amino-2-pyrazolin-5-one and in the preparation of 3-carboxylic acid acylamino-2-pyrazolin-5-ones the Friedel Crafts metal halide is preferably used in amounts of approximately 1.52–2 mole per mole of amino compound.

As Friedel Crafts metal halide an aluminium halide, more particularly aluminium chloride is preferably used. The reaction temperature is generally not very high and generally comprised between 10° and 100°C; in many cases a temperature of 50°C guarantees a fast reaction and a good yield.

In order to facilitate dissolution of the reaction components an inert and anhydrous solvent as commonly used in association with Friedel Crafts metal halides may be used in addition to the heterocyclic nitrogen-containing basic condensing agent. The presence of such an inert solvent is not at all necessary but may be preferred over the use of large amounts of said condensing agent that are otherwise necessary in order to dissolve the reaction components. Examples of anhydrous inert solvents are nitrobenzene, halogenated and nitrated aliphatic hydrocarbons such as nitromethane, methylene chloride, 1,2-dichloroethane and carbon tetrachloride.

The following preparations illustrate the present invention.

Preparation 1

1-phenyl-3-phenylsulphonamido-2-pyrazolin-5-one

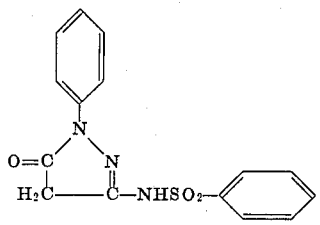

In a flask fitted with stirrer, thermometer, and reflux condenser provided with drying tube 26.7 g (0.2 mole) of anhydrous aluminium chloride are dissolved in 200 ml of pyridine. Then 35 g (0.2 mole) of 1 phenyl-3-amino-2-pyrazolin-5-one and 35.3 g (0.2 mole) of benzene sulphochloride are added successively at room temperature. The mixture is stirred for 30 min. at room temperature whereupon it is heated for 4 hours at 50°C. The solution, originally clear and red coloured, turns brown and turbid. The mixture is poured into 500 ml of 5 N hydrochloric acid diluted with 500 ml of water and the precipitate formed is filtered off by suction. After having been dried, the product is recrystallized from acetic acid. Yield: 45 g (71 %). Melting point: 240°C.

Preparation 2

1-phenyl-3-methylsulphonamido-2-pyrazolin-5-one

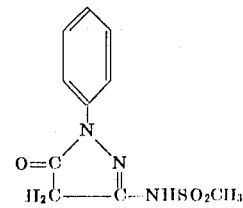

In a 500 ml flask fitted with stirrer, thermometer and reflux condenser provided with drying tube 26.7 g (0.2 mole) of aluminium chloride and 35 g (0.2 mole) of 1-phenyl-3-amino-2-pyrazolin-5-one are dissolved in 200 ml of pyridine at room temperature. Then 22.9 g (0.2 mole) of methane sulphochloride are added whereupon the mixture is stirred at room temperature for 24 hours. The reaction mixture is poured into 1 l of 5 N hydrochloric acid. The precipitate formed is filtered by suction and purified by recrystallization from 2-ethoxyethanol.

Yield: 36 g (71 %). Melting point: 245°C.

Preparation 3

1-phenyl-3-(m-nitrophenylsulphonamido)-2-pyrazolin-5-one

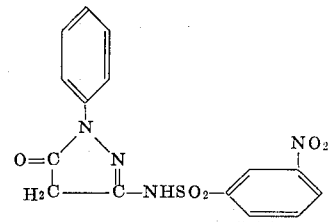

In a 2 l flash fitted with stirrer, thermometer and reflux condenser provided with drying tube 146.5 g (1.1 mole) of anhydrous aluminium chloride are dissolved in 1000 ml of pyridine. Then 175 g (1 mole) of 1-phenyl-3-amino-2-pyrazolin-5-one are added and dissolved by heating. The reaction mixture is cooled to 10°C whereupon 221.5 g (1 mole) of m-nitrobenzene sulphochloride are added portion-wise in such a way that the temperature does not rise above 20°C. The mixture is stirred for 4 hours at 50°C whereupon it is poured into 8 l of 3 N hydrochloric acid. The mixture is left standing overnight and the precipitate formed is washed with water and methanol successively. The product is stirred in 1 l of methyl acetate, filtered and dried. Yield: 308 g (85 %). Melting point: 240°C.

Preparation 4

1-(p-hexadecylsulphonylphenyl)-3-(2-phenyoxyethylsulphonamido)-2-pyrazolin-5-one

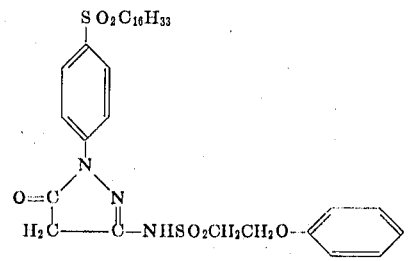

To a solution of 6.67 g (0.05 mole) of anhydrous aluminium chloride in 50 ml of pyridine, 23.2 g (0.05 mole) of 1-(p-hexadecylsulphonylphenyl)-3-amino-2-pyrazolin-5-one prepared as described in U.S. Pat. No. 3,325,482, are added and dissolved by heating. The solution is cooled to 20°C whereupon 11 g (0.05 mole) of 2-phenoxyethanesulphochloride prepared as described in Dutch Pat. No. 294,368 are added and the whole is stirred at room temperature for 24 hours. The reaction mixture is poured into 500 ml of 5 N hydrochloric acid whereupon the precipitate formed is filtered off. The dried product is purified by recrystallization from butyl acetate. Yield: 20 g (63 %). Melting point: 221°C.

Preparation 5

1-(2,4,6-trichlorophenyl)-3-hexadecylsulphonamido-2-pyrazolin-5-one

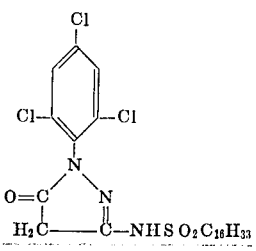

To a solution of 20 g (0.15 mole) of anhydrous aluminium chloride in 200 ml of pyridine, 27.85 g (0.1 mole) of 1-(2,4,6-trichlorophenyl)-3-amino-2-pyrazolin-5-one are added. To the solution formed a solution of 32.45 g (0.1 mole) of n-hexadecane sulphochloride (prepared as described hereinafter) in 50 ml of pyridine is added gradually. The solution is stirred for 24 hours at room temperature whereupon the reaction mixture is poured into 500 ml of concentrated hydrochloric acid. The oily product is separated, taken up in dichloromethane, washed with water and the organic layer is dried over magnesium sulphate. After evaporation of the solvent the residual oil is boiled in hexane. The precipitate formed is filtered and dried. Yield: 37 g (65 %). Melting point: 110°C.

The n-hexadecane sulphochloride is prepared according to the method described by Douglas, et al, in J.Org.Chem.26, 1996/99 (1961) starting from n-hexadecylmercaptan and chlorine in a mixture of dichloromethane and acetic acid. The product was recrystallized from hexane. Yield: 70 %. Melting point: 54°C.

Preparation 6

1-benzyl-3-hexadecylsulphonamido-2-pyrazolin-5-one

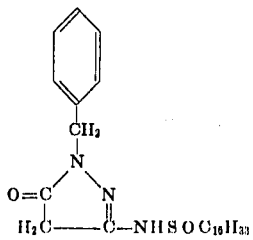

To a solution of 13.4 g (0.1 mole) of anhydrous aluminium chloride in 100 ml of pyridine, 18.9 g (0.1 mole) of 1-benzyl-3-amino-2-pyrazolin-5-one prepared as described in published Dutch Pat. No. 6711915 and 34.05 g (0.105 mole) of n-hexadecane-sulphochloride are added successively at room temperature. The reaction mixture is stirred for 4 hours at 50°C and then poured into 750 ml of 5 N hydrochloric acid. The precipitate formed is filtered off, dried and recrystallized from n-propanol. Yield: 28.7 g (60 %). Melting point: 181°C.

Preparation 7

1-(p-methylsulphonylphenyl)-3-hexadecylsulphonamido-2-pyrazolin-5-one

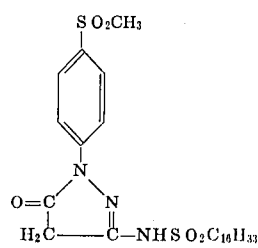

To a solution of 9.35 g (0.07 mole) of anhydrous aluminium chloride and 17.7 g(0.07 mole) of 1-(p-methylsulphonylphenyl)-3-amino-2-pyrazolin-5-one prepared as described in U.S. Pat. No. 3,325,482 in 140 ml of pyridine, 22.8 g (0.07 mole) of n-hexadecane sulphochloride are added at room temperature. The reaction mixture is stirred for 24 hours at room temperature whereupon it is poured into 700 m l of 5 N hydrochloric acid. The precipitate formed is filtered and recrystallized from a mixture of glacial acetic acid and dimethylformamide. Yield: 28 g (73 %). Melting point: 236°C.

Preparation 8

1-(4-phenyl-2-thiazolyl)-3-hexadecylsulphonamido-2-pyrazolin-5-one

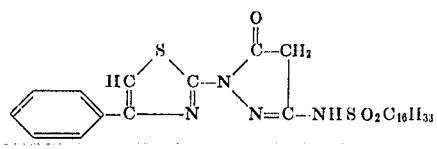

12 g (0.09 mole) of anhydrous aluminium chloride and 23.2 g (0.09 mole) of 1-(4-phenyl-2-thiazolyl)-3-amino-pyrazolin-5-one prepared as described hereinafter are dissolved in 140 ml of pyridine. At 20°C 29.2 g (0.09 mole) of n-hexadecane sulphochloride are added portionwsie. The reaction mixture is stirred for 4 hours at 50°C and poured into 900 ml of 5 N hydrochloric acid. The precipitate formed is filtered off and recrystallized from ethanol. Yield: 33 g (67 %). Melting point: 132°C.

The 1-(4-phenyl-2-thiazolyl)-3-amino-2-pyrazolin-5-one is prepared as follows:

To a suspension of 19.1 g (0.1 mole) of 2-hydrazino-4-phenylthiazole prepared as described by H. Beyer, et al., Ber. 85, 1122-1129 (1952) in 100 ml of pyridine, 19.6 g (0.1 mole) of β-amino-β-ethoxy-acrylic acid ethyl ester hydrochloride are added. The mixture is stirred for 30 min. at room temperature whereupon 19.2 g (0.3 mole) of potassium hydroxide dissolved in ethanol are added. The mixture is stirred for 1 hour and then diluted with water and acidified with 2 N hydrochloric acid. The precipitate formed is filtered off and recrystallized from 2-ethoxyethanol. Melting point: 230°C.

Preparation 9

1-(p-N-methyl-N-hexadecylsulphamoylphenyl)-3-(2-naphthyl-sulphonamido)-2-pyrazolin-5-one

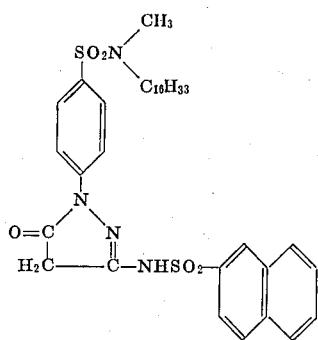

In a flask fitted with stirrer, thermometer, and reflux condenser provided with drying tube, 13.4 g (0.1 mole) of anhydrous aluminium chloride and 49.2 g (0.1 mole) of 1-(p-N-methyl-N-hexadecylsulphamoyl-phenyl)-3-amino-2-pyrazolin-5-one prepared as described in U.S. Pat. No. 3,330,660, are dissolved in 150 ml of pyridine. At room temperature, 22.65 g (0.1 mole) of 2-naphthalene sulphochloride are added whereupon the reaction mixture is stirred for 24 hours at room temperature. The reaction mixture is poured into 500 ml of 5 N hydrochloric acid whereupon the precipitate formed is filtered off and recrystallized from a mixture of acetonitrile and dimethylformamide (9:1). Yield: 54 g (88 %). Melting point: 200°C.

Preparation 10

1-phenyl-3-p-acetamidophenyl sulphonamido-2-pyrazolin-5-one

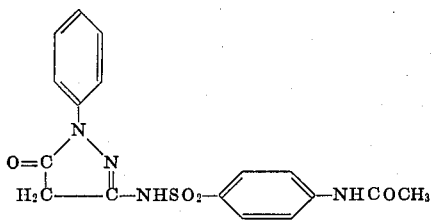

To a solution of 26.7 g (0.2 mole) of anhydrous aluminium chloride and 35 g (0.2 mole) of 1-phenyl-3-amino-2-pyrazolin-5-one in 300 ml of pyridine, 51.5 g (0.22 mole) of 90 % p-acetamido-benzene sulphochloride are added at room temperature. The mixture is stirred for 1 hour at 20°C and then for 4 hours at 50°C whereupon it is poured into 1,000 ml of 5 N hydrochloric acid. The precipitate formed is filtered off, washed with methanol and dried. Yield: 52.5 g (70 %). Melting point: 244°C.

Preparation 11

1-m-hexadecyloxyphenyl-3-phenylsulphonamido-2-pyrazolin-5-one

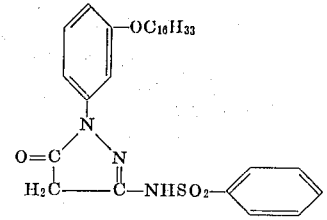

31.1 g (0.075 mole) of 1-m-hexadecyloxyphenyl-3-amino-2-pyrazolin-5-one prepared as described in U.S. Pat. No. 3,325,482, and 10 g (0.075 mole) of anhydrous aluminium chloride are dissolved in a mixture of 37.5 ml of nitrobenzene and 18.8 ml of pyridine. At room temperature, 13.25 g (0.075 mole) of benzene sulphochloride are added whereupon the reaction mixture is stirred for 4 hours at 50°C. The mixture is poured into 400 ml of 4 N hydrochloric acid whereupon the precipitate formed is filtered off, washed with water and recrystallized from ethanol. Yield: 30 g (72 %). Melting point: 157°C.

Preparation 12

1-p-hexadecylsulphamoylphenyl-3-p-methoxyphenylsulphonamido-2-pyrazoline-5-one

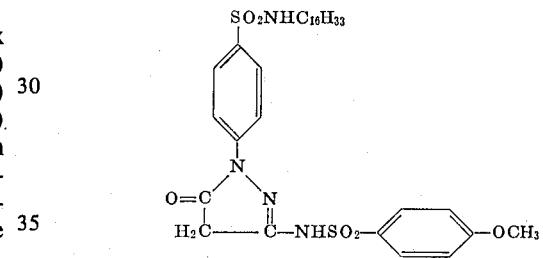

To a solution of 6.68 g (0.05 mole) of anhydrous aluminium chloride and 23.9 g (0.05 mole) of 1-p-hexadecylsulphamoylphenyl-3-amino-2-pyrazolin-5-one prepared as described in U.S. Pat. No. 3,325,482, in 50 ml of pyridine, 10.4 g (0.05 mole) of p-methoxy-benzene sulphochloride are added at 20°C. The reaction mixture is kept for 24 hours at room temperature and then poured into a mixture of 250 ml of methanol and 250 ml of concentrated hydrochloric acid. The precipitate formed is recrystallized from butyl acetate. Yield: 24.5 g (76 %). Melting point: 204°C.

Preparation 13

1-o-octadecylthiophenyl-3-benzoylamino-2-pyrazolin-5-one

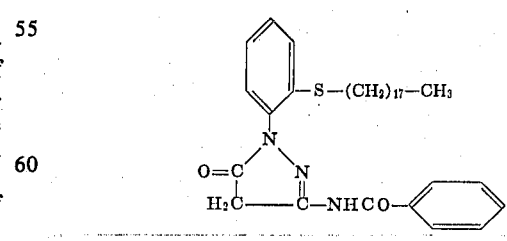

To a warm solution of 13.4 g (0.1 mole) of anhydrous aluminium chloride in 100 ml of pyridine, 23 g (0.05 mole) of 1-o-octadecylthiophenyl-3-amino-2-pyrazolin-5-one are added. Then 7.1 g (0.05 mole) of benzoylchloride are added at room temperature whereupon the whole is heated for 2 hours at 50°C. The mixture is poured into 5 N hydrochloric acid and the precipitate formed is filtered off and recrystallized from acetonitrile. Yield: 40 g (70 %). Melting point: 71°C.

Preparation 14
1-p-hexadecylsulphonylphenyl-3-acetylamino-2-pyrazolin-5-one

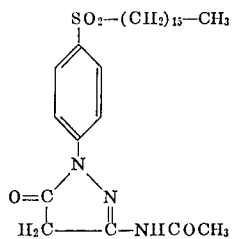

To a solution of 20 g (0.14 mole) of anhydrous aluminium chloride and 23.14 g (0.05 mole) of 1-p-hexadecylsulphonylphenyl-3-amino-2-pyrazolin-5-one in 100 ml of pyridin, 5.1 g (0.05 mole) of acetic anhydride are added. The temperature rises to 40°C. The mixture is stirred for 2 hours at 40°C whereupon it is poured into 200 ml of concentrated hydrochloric acid. The precipitate is filtered by suction and recrystallized from ethylene gylcol monomethyl ether. Yield: 79 %. Melting point: 154°C.

Preparation 15
1-o-(1,1,2-trifluoro-2-chloroethoxy)phenyl-3-p-hexadecyloxybenzoylamino-2-pyrazolin-5-one

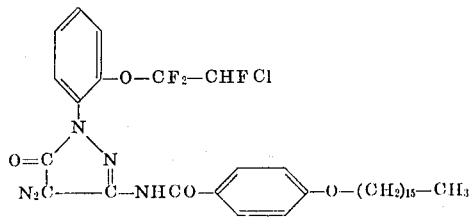

In a 250 ml three-necked flask fitted with stirrer and reflux condenser 13.4 g (0.1 mole) of aluminium chloride are dissolved in 100 ml of pyridin. To this solution, 15.4 g (0.05 mole) of 1-o-(1,1,2-trifluoro-2-chloroethoxy)phenyl-3-amino-2-pyrazolin-5-one are added. The mixture is stirred for 20 min. whereupon 19 g (0.05 mole) of p-hexadecyloxybenzoyl chloride are added at room temperature. After having been stirred for 15 min. the reaction mixture is kept for 3 hours at 40°–46°C. The mixture is concentrated till dry by evaporation and the solid product is dissolved in warm ethylene glycol monomethyl ether. 250 ml of hydrochloric acid (d : 1.19) are added and the oil obtained is separated whereupon ice is added. The precipitate formed is filtered by suction and washed first with warm water and then with cold water.

The crude product is dissolved in warm methanol and the solution is made alkaline by addition of 1 N sodium hydroxide, diluted with water and acidified by means of acetic acid. The oil formed solidifies upon standing and the precipitate is filtered off, washed twice with warm water and dried. The colour coupler is recrystallized from methanol. Yield: 90 %. Melting point: 88°C.

Preparation 16
1-o-(1,1,2-trifluoro-2-chloroethoxy)phenyl-3-arachidoylamino-2-pyrazolin-5-one

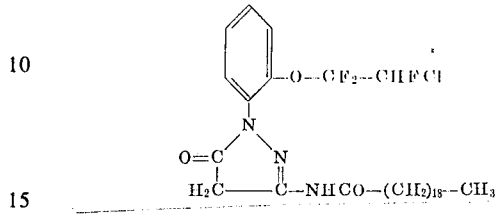

In a three-necked flask fitted with stirrer, thermometer and reflux condenser 13.4 g (0.1 mole) of anhydrous aluminium chloride are dissolved in 100 ml of pyridine. Then 15.4 g (0.05 mole) of 1-o-(1,1,2-trifluoro-2-chloroethoxy)phenyl-3-amino-2-pyrazolin-5-one are added and the mixture is stirred for 20 min. At room temperature, 16.5 g (0.05 mole) of arachiodoyl chloride are added and the reaction mixture is then heated for 3 hours at 40°–45°C. The mixture is concentrated till dry by evaporation under reduced pressure and the residue is dissolved in ethylene glycol monomethyl ether and 250 ml of hydrochloric acid (d : 1.19). The oil formed solidifies by addition of ice. The solids are filtered off and washed first with water of 60°C and then with cold water.

The crude product is purified by dissolving in methanol, making alkaline by means of 1 N sodium hydroxide dilution with water and acidifying with acetic acid. The oil formed solidifies upon standing and the precipitate is washed twice with water and dried. The product is recrystallized from methanol. Yield: 73 %. Melting point: 72°C.

We claim:
1. In a process for the preparation of a 3-acylamino-2-pyrazolin-5-one by allowing a 3-amino-2-pyrazolin-5-one to react with an acid chloride or anhydride, the improvement wherein the reaction is carried out in the presence of a heterocyclic nitrogen-containing basic condensing agent and a Friedel Crafts metal halide.

2. A process according to claim 1, wherein the reaction is carried out at a temperature of from about 10° to 100°C.

3. A process according to claim 1, wherein the acid chloride is sulphochloride, thereby forming 3-sulphonamido-2-pyrazolin-5-one.

4. A process according to claim 1, wherein the Friedel Crafts metal halide is aluminium chloride.

5. A process according to claim 1, wherein the heterocyclic nitrogen-containing basic condensing agent is pyridine or a derivative thereof.

6. A process according to claim 1, including the use of an anhydrous inert solvent for the reaction components.

7. A process according to claim 6, wherein said inert solvent is selected from the group consisting of nitrobenzene, nitromethane, methylene chloride, 1,2-dichloroethane and carbon tetrachloride.

* * * * *